US010551067B2

(12) United States Patent
Okita et al.

(10) Patent No.: US 10,551,067 B2
(45) Date of Patent: Feb. 4, 2020

(54) COMBUSTOR LINER WITH DUAL WALL COOLING STRUCTURE

(71) Applicant: IHI Corporation, Tokyo (JP)

(72) Inventors: Yoji Okita, Tokyo (JP); Chiyuki Nakamata, Tokyo (JP); Yuuta Matsumoto, Tokyo (JP); Jun Hosoi, Tokyo (JP); Nagayoshi Hiromitsu, Tokyo (JP)

(73) Assignee: IHI CORPORATION (JP)

( * ) Notice: Subject to any disclaimer, the term of this patent is extended or adjusted under 35 U.S.C. 154(b) by 253 days.

(21) Appl. No.: 15/672,435

(22) Filed: Aug. 9, 2017

(65) Prior Publication Data

US 2017/0370586 A1    Dec. 28, 2017

Related U.S. Application Data (60) Division of application No. 14/270,811, filed on May 6, 2014, now abandoned, which is a continuation of
(Continued)

(30) Foreign Application Priority Data

Nov. 10, 2011   (JP) .................................. 2011-246602

(51) Int. Cl.
| | |
|---|---|
| *F23R 3/00* | (2006.01) |
| *F23R 3/60* | (2006.01) |
| *F23R 3/06* | (2006.01) |

(52) U.S. Cl.
CPC .............. *F23R 3/002* (2013.01); *F23R 3/005* (2013.01); *F23R 3/007* (2013.01); *F23R 3/06* (2013.01);
(Continued)

(58) Field of Classification Search
CPC .. F23R 3/002; F23R 3/005; F23R 3/06; F23R 3/007; F23R 2900/00017;
(Continued)

(56) References Cited

U.S. PATENT DOCUMENTS

| | | | |
|---|---|---|---|
| 2,544,538 A | 3/1951 | Mahnken | 126/39 M |
| 3,956,886 A | 5/1976 | Sedgwick | 60/753 |

(Continued)

FOREIGN PATENT DOCUMENTS

| | | |
|---|---|---|
| JP | 57-124620 | 8/1982 |
| JP | 06-507468 | 8/1994 |

(Continued)

OTHER PUBLICATIONS

Fureby, C. and Fedina, E., "A Computational Study of Multi-Burner Annular Aero Gas Turbine", 27$^{th}$ International Congress of the Aeronautical Sciences (ICAS), France, Sep. 19-24, 2010. pp. 1-10.
(Continued)

*Primary Examiner* — Lorne E Meade
(74) *Attorney, Agent, or Firm* — Ostrolenk Faber LLP (57) ABSTRACT

The invention is a combustor liner (12) of a dual wall cooling structure including an inner wall section (30) configured to surround a combustion region (13) and in which a plurality of effusion cooling holes (31) are formed, and an outer wall section (20) formed to be spaced apart from the inner wall section (30) and in which a plurality of impingement cooling holes (21) are formed, wherein the inner wall section (30) is constituted by a plurality of plate-shaped members (40), and a support guide member (50) is provided which is configured to guide the plurality of plate-shaped members (40) to enable free insertion and extraction and support the plurality of plate-shaped members (40) at intervals such that deformation by thermal expansion is able to be absorbed.

6 Claims, 7 Drawing Sheets

Related U.S. Application Data application No. PCT/JP2012/078733, filed on Nov. 6, 2012.

(52) U.S. Cl.
CPC ...... *F23R 3/60* (2013.01); *F05D 2260/22141* (2013.01); *F23R 2900/00005* (2013.01); *F23R 2900/00017* (2013.01); *F23R 2900/03041* (2013.01); *F23R 2900/03044* (2013.01); *Y02T 50/675* (2013.01)

(58) Field of Classification Search
CPC .. F23R 2900/03041; F23R 2900/03044; F23R 3/05
See application file for complete search history.

(56) References Cited

U.S. PATENT DOCUMENTS

| | | | | |
|---|---|---|---|---|
| 4,158,949 | A | 7/1979 | Reider | 60/737 |
| 4,480,436 | A | 11/1984 | Maclin | 60/752 |
| 4,555,901 | A | 12/1985 | Wakeman | 60/752 |
| 4,567,730 | A | 2/1986 | Scott | 60/752 |
| 4,614,082 | A | 9/1986 | Sterman | 60/752 |
| 4,688,310 | A | 8/1987 | Kelm | 29/889.22 |
| 4,805,397 | A | 2/1989 | Barbier | 60/759 |
| 4,901,522 | A | 2/1990 | Commaret et al. | 60/39.32 |
| 4,907,411 | A * | 3/1990 | Krueger | F23R 3/007 60/753 |
| 5,486,553 | A | 1/1996 | Deaner et al. | 524/13 |
| 5,499,499 | A * | 3/1996 | Ambrogi | F23R 3/06 60/800 |
| 5,539,027 | A | 7/1996 | Deaner et al. | 524/13 |
| 5,598,697 | A | 2/1997 | Ambrogi | 60/752 |
| 6,702,549 | B2 * | 3/2004 | Tiemann | F01D 5/22 277/630 |
| 6,725,666 | B2 | 4/2004 | Tiemann | 60/752 |
| 7,146,815 | B2 | 12/2006 | Burd | 60/752 |
| 8,099,961 | B2 | 1/2012 | Gerendas | 60/752 |
| 2002/0056277 | A1 | 5/2002 | Parry | 60/752 |
| 2003/0145604 | A1 | 8/2003 | Pidcock | 60/796 |
| 2005/0022531 | A1 | 2/2005 | Burd | 60/752 |
| 2008/0264065 | A1 | 10/2008 | Gerendas | 60/754 |

FOREIGN PATENT DOCUMENTS

| | | |
|---|---|---|
| JP | 08-254317 | 10/1996 |
| JP | 2001-227359 | 8/2001 |
| JP | 2010-043643 | 2/2010 |
| WO | WO 92/16798 A1 | 10/1992 |

OTHER PUBLICATIONS

Giancoli, D., "Physics for Scientists & Engineers", 4$^{th}$ Edition, Pearson Prentice Hall, Upper Saddle River, NJ (2008) pp. 459-461.
Haynes® 625 alloy, Haynes International, H-3073D (2001) pp. 1-16.
Haynes® 188, Jan. 10, 2010 Wayback Machine [https://web.archive.org/web/20100110211206/http://hightempmetals.com/teachdata/hitempHaynes188.data.php].
International Search Report and Written Opinion dated Jan. 15, 2013 in corresponding PCT International Application No. PCT/JP2012/078733.
Extended European Search Report dated Jun. 9, 2015 in corresponding European Application No. 12846946.7.

\* cited by examiner

COMBUSTOR LINER WITH DUAL WALL COOLING STRUCTURE

CROSS REFERENCE TO RELATED APPLICATIONS

The present application is a divisional under 37 C.F.R. § 1.53(b) of prior U.S. patent application Ser. No. 14/270,811, filed May 6, 2014 (now abandoned), which in turn is a continuation of PCT International Application No. PCT/JP2012/078733, filed Nov. 6, 2012, which claims priority to Japanese Patent Application No. 2011-246602, filed Nov. 10, 2011. The contents of each of these applications are incorporated in full by reference herein.

TECHNICAL FIELD

The present invention relates to a combustor liner.

BACKGROUND ART

Since a combustor such as a gas turbine or the like is exposed to a combusted gas having a high temperature, a liner surrounding a combustion region should be cooled. As a means for cooling a combustor liner, an impingement cooling type is provided. In this type, a liner wall is provided as a dual wall structure of an inner wall section and an outer wall section, and a plurality of impingement cooling holes are formed at the outer wall section. Accordingly, using a differential pressure between the inside and the outside of the combustor, a cooling gas is injected toward and collides with the inner wall section from the impingement cooling holes. As a result, the inner wall section exposed to the combusted gas having the high temperature can be cooled.

In addition, as the means for cooling the combustor liner, an effusion cooling type is provided. In this type, a plurality of effusion cooling holes are formed in an inner wall section. Accordingly, in addition to convection cooling by a cooling gas passing through a dual wall, the cooling gas is discharged to a combustion region from the effusion cooling hole. As a result, a gas film is formed at a surface of the inner wall section exposed to the combusted gas having the high temperature, and the inner wall section can be cooled.

Further, in the following Patent Document 1, a combustor liner having a dual wall cooling structure in which the impingement cooling type and the effusion cooling type are combined is disclosed. The combustor liner is characterized in that a cooling gas is discharged to a combustion region in a honeycomb shape, and includes an inner wall section constituted by a plurality of inner wall forming members having regular hexagonal shapes, and an outer wall forming member joined with the inner wall forming members via a joining member having a predetermined shape and configured to support the inner wall forming members. Joining of the joining member to the inner wall forming members and the outer wall forming member is performed by diffusion welding.

CITATION LIST

Patent Document

[Patent Document 1] Japanese Unexamined Patent Application, First Publication No. H08-254317

SUMMARY OF INVENTION

Technical Problem

However, when the inner wall forming members and the outer wall forming member are integrally joined via the joining member through the diffusion welding or the like, maintainability is decreased. That is, when cracks are generated from the inner wall forming member due to thermal expansion or the like, all of a set of liner parts should be exchanged.

In addition, when the inner wall forming members and the outer wall forming member are integrally joined via the joining member through the diffusion welding or the like, thermal durability is decreased. That is, when a dual wall cooling structure is employed, in the inner wall section exposed to the combusted gas having the high temperature and the outer wall section through which a cooling gas having a low temperature flows, a thermal expansion difference is large. As a result, the above-mentioned joining interferes with free thermal expansion of the inner wall forming member, and excessive thermal stress is generated to easily generate the cracks.

In consideration of the above-mentioned problems, an object of the present invention is to provide a combustor liner having good maintainability and thermal durability.

Solution to Problem

A first aspect of the present invention is a combustor liner of a dual wall cooling structure including an inner wall section configured to surround a combustion region and in which a plurality of effusion cooling holes are formed, and an outer wall section formed to be spaced apart from the inner wall section and in which a plurality of impingement cooling holes are formed. In the combustor liner, the inner wall section is constituted by a plurality of plate-shaped members, and a support guide member is provided which is configured to guide the plurality of plate-shaped members to enable free insertion and extraction, and support the plurality of plate-shaped members at intervals such that deformation by thermal expansion is able to be absorbed.

As the first aspect of the present invention is employed, the plurality of plate-shaped members that form the inner wall section are guided by the support guide member to enable free insertion and extraction. For this reason, the plate-shaped member to be repaired can be easily selectively removed. In addition, the support guide member supports the plurality of plate-shaped members at intervals such that deformation by the thermal expansion can be absorbed. For this reason, the plate-shaped members can freely thermally expand, and generation of excessive thermal stress can be suppressed.

In addition, according to a second aspect of the present invention, in the combustor liner of the first aspect, the support guide member has a rail member configured to guide both sides of the plate-shaped member.

As the second aspect of the present invention is employed, both sides of the plate-shaped member are guided by the rail member, and the plate-shaped member is freely inserted and extracted in a direction in which a rail extends.

In addition, according to a third aspect of the present invention, the combustor liner of the first or second aspect has a positioning member configured to position the plate-shaped member supported by the support guide member with respect to the outer wall section.

As the third aspect of the present invention is employed, the plate-shaped member is positioned with respect to the outer wall section, and clearance of a dual wall is constantly defined. For this reason, design of a shape or the like of the plate-shaped member in consideration of cooling efficiency becomes easy.

In addition, according to a fourth aspect of the present invention, in the combustor liner of the third aspect, the positioning member has a movable member configured to hold a distance between the plate-shaped member and the outer wall section and movable with respect to the outer wall section in a thermal expansion direction of the plate-shaped member.

As the fourth aspect of the present invention is employed, even when the plate-shaped member thermally expands while the distance of the plate-shaped member with respect to the outer wall section is held, the movable member is movable with respect to the outer wall section according to the thermal expansion. For this reason, thermal expansion of the plate-shaped member is not inhibited by such positioning.

In addition, according to a fifth aspect of the present invention, in the combustor liner of the fourth aspect, the positioning member includes the movable member; and a fixing member configured to hold a distance between the plate-shaped member and the outer wall section and fixed with respect to the outer wall section.

As the fifth aspect of the present invention is employed, even when the plate-shaped member thermally expands about the fixing member while the distance of the plate-shaped member with respect to the outer wall section with the fixing member and the movable member is held, the movable member is movable with respect to the outer wall section according to the thermal expansion. For this reason, thermal expansion of the plate-shaped member is not inhibited by such positioning.

In addition, according to a sixth aspect of the present invention, in the combustor liner of the fifth aspect, the fixing member is disposed at a central position of the plate-shaped member, and the movable members are disposed around the central position of the plate-shaped member.

As the sixth aspect of the present invention is employed, when the fixing member is disposed at the central position of the plate-shaped member, a displacement amount of an edge section of the plate-shaped member generated by the thermal expansion is substantially uniformized. For this reason, designs such as clearance of the dual wall, a shape of the plate-shaped member, and so on, become easy.

In addition, according to a seventh aspect of the present invention, in the combustor liner of any one of the first to sixth aspects, a plurality of fuel supply nozzles configured to supply fuel to the combustion region have an annular shape disposed in a circumferential direction at intervals, and the plurality of plate-shaped members supported by the support guide member are disposed at positions corresponding to the plurality of fuel supply nozzles disposed in the circumferential direction.

As the seventh aspect of the present invention is employed, the plate-shaped members are disposed according to disposition of the fuel supply nozzles, and thermal expansion of the plate-shaped members can be substantially uniformized without a bias. In the circumferential direction of the annular type liner, this is based on combustion generated at the position at which the fuel supply nozzle is disposed, and generation of temperature distribution.

In addition, according to an eighth aspect of the present invention, in the combustor liner of any one of the first to seventh aspects, a plurality of heat radiation pins protruding toward the outer wall section are formed at the plate-shaped member.

As the eighth aspect of the present invention is employed, heat of the plate-shaped member exposed to a high temperature is guided of the dual wall through heat transfer and a heat-releasing area of the dual wall is increased. Accordingly, cooling efficiency by the cooling gas flowing through the dual walls can be increased.

Advantageous Effects of Invention

According to the present invention, a combustor liner having good maintainability and thermal durability can be obtained.

EMBODIMENTS OF INVENTION

Hereinafter, an embodiment of the present invention will be described with reference to the accompanying drawings.

(First Embodiment)

Figure 1:
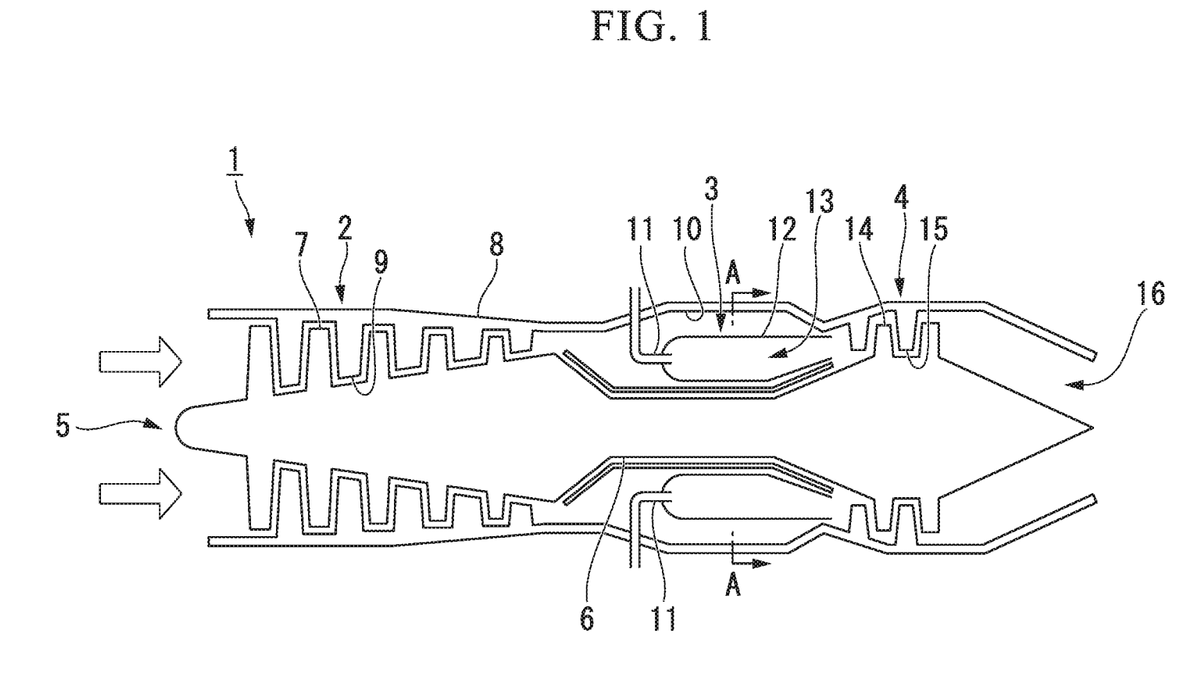
FIG. 1 is a configuration view showing a gas turbine having a combustor liner according to a first embodiment of the present invention.

FIG. 1 is a configuration view of a gas turbine 1 having a combustor liner according to a first embodiment of the present invention.

As shown in FIG. 1, the gas turbine 1 has a compressor 2, a combustor 3, and a turbine 4. The compressor 2 compresses external air suctioned from a suction port 5 between a compressor blade 7 rotated with a turbine shaft 6 and a compressor vane 9 fixed to a housing 8 to increase a pressure thereof. The compressed air having increased pressure is supplied to a compressed air chamber 10 at which the combustor 3 is disposed.

The combustor 3 mixes a fuel gas supplied via a fuel supply nozzle 11 with compressed air supplied from the compressor 2, combusts the mixed gas at a combustion region 13 formed by a liner 12, and supplies the combusted gas to the turbine 4.

The turbine 4 includes a turbine moving blade 14 rotated with the turbine shaft 6 and a turbine stationary vane 15 fixed to the housing 8, and obtains rotating kinetic energy from the combusted gas supplied from the combustor 3. The combusted gas which has passed through the turbine blade is exhausted to the outside via an exhaust port 16.

The combustor 3 is installed in the compressed air chamber 10. The compressed air chamber 10 is an annular space having an outline constituted by the housing 8 and formed around the turbine shaft 6. The combustor 3 has the liner (the combustor liner) 12 formed along the annular space of the compressed air chamber 10. The liner 12 of the embodiment employs an annular type liner including a ring shape (an annular shape) around the turbine shaft 6. Further, a can type liner having a cylindrical shape may be employed as the liner 12.

Figure 2:
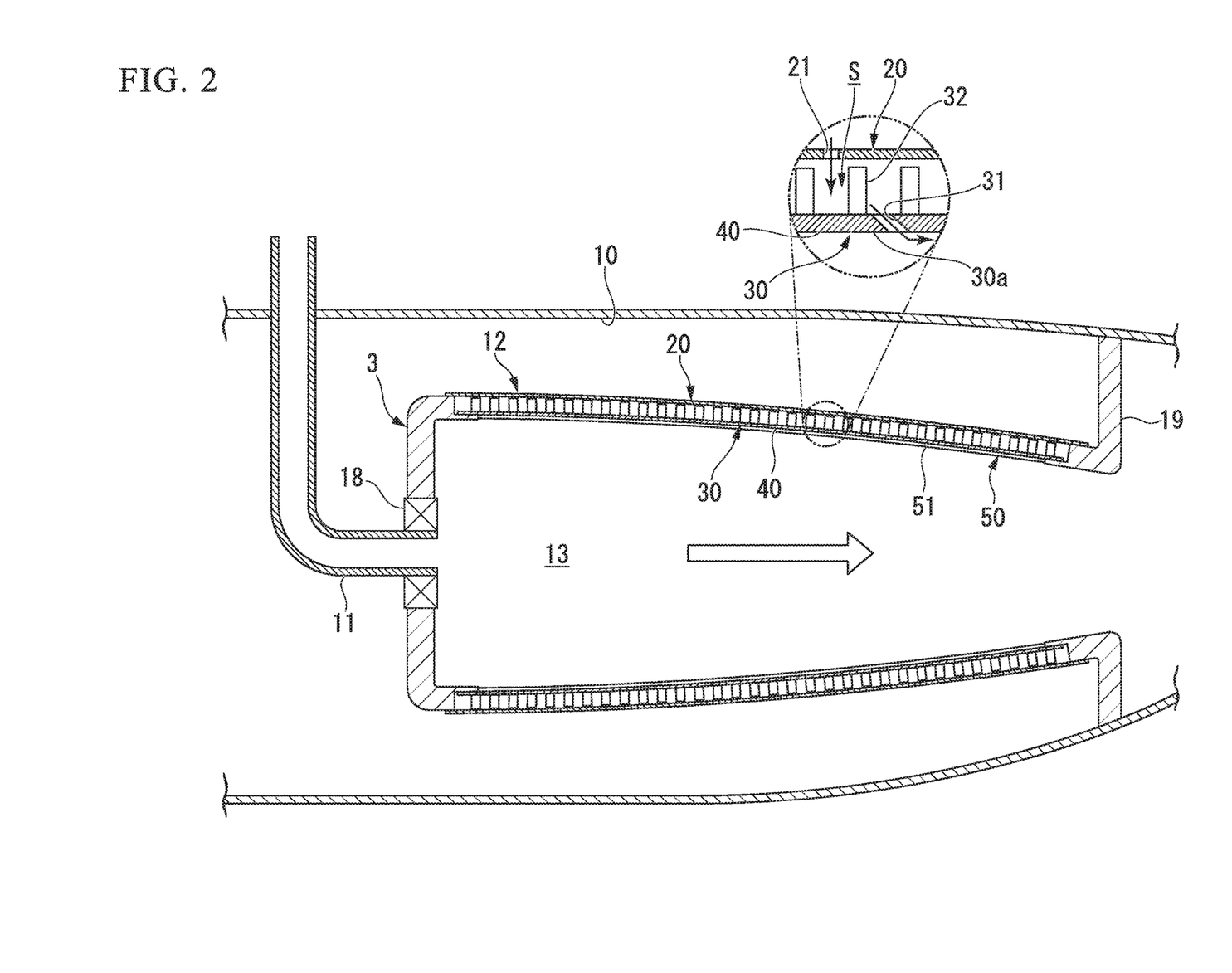
FIG. 2 is a configuration view showing a combustor according to the first embodiment of the present invention.

FIG. 2 is a configuration view of the combustor 3 according to the first embodiment of the present invention. The liner 12 is provided with the fuel supply nozzle 11 connected to a side (a base end side, a left side of the drawing) at which the compressed air is supplied from the compressor 2 to the liner 12. The plurality of fuel supply nozzles 11 are connected to the annular liner 12 at predetermined intervals. A swirler 18 is installed around the fuel supply nozzle 11. The swirler 18 introduces the compressed air supplied from the compressor 2 to the combustion region 13 from the vicinity of the fuel supply nozzle 11 and provides a rotational flow to mix the compressed air and the fuel gas, generating a mixed gas.

The liner 12 has a dual wall cooling structure including an outer wall section 20 and an inner wall section 30. The inner wall section 30 faces the combustion region 13 and surrounds the combustion region 13. The outer wall section 20 is formed to be spaced apart from the inner wall section 30. That is, a region represented by reference character S (hereinafter referred to as a gap S) is formed between the inner wall section 30 and the outer wall section 20.

A plurality of impingement cooling holes 21 are formed at the outer wall section 20. The impingement cooling hole 21 introduces the compressed air (a cooling gas) into the gap S from the compressed air chamber 10 to inject the compressed air toward the inner wall section 30 to collide therewith. Accordingly, the inner wall section 30 disposed to face the combustion region 13 is cooled.

Figure 3:
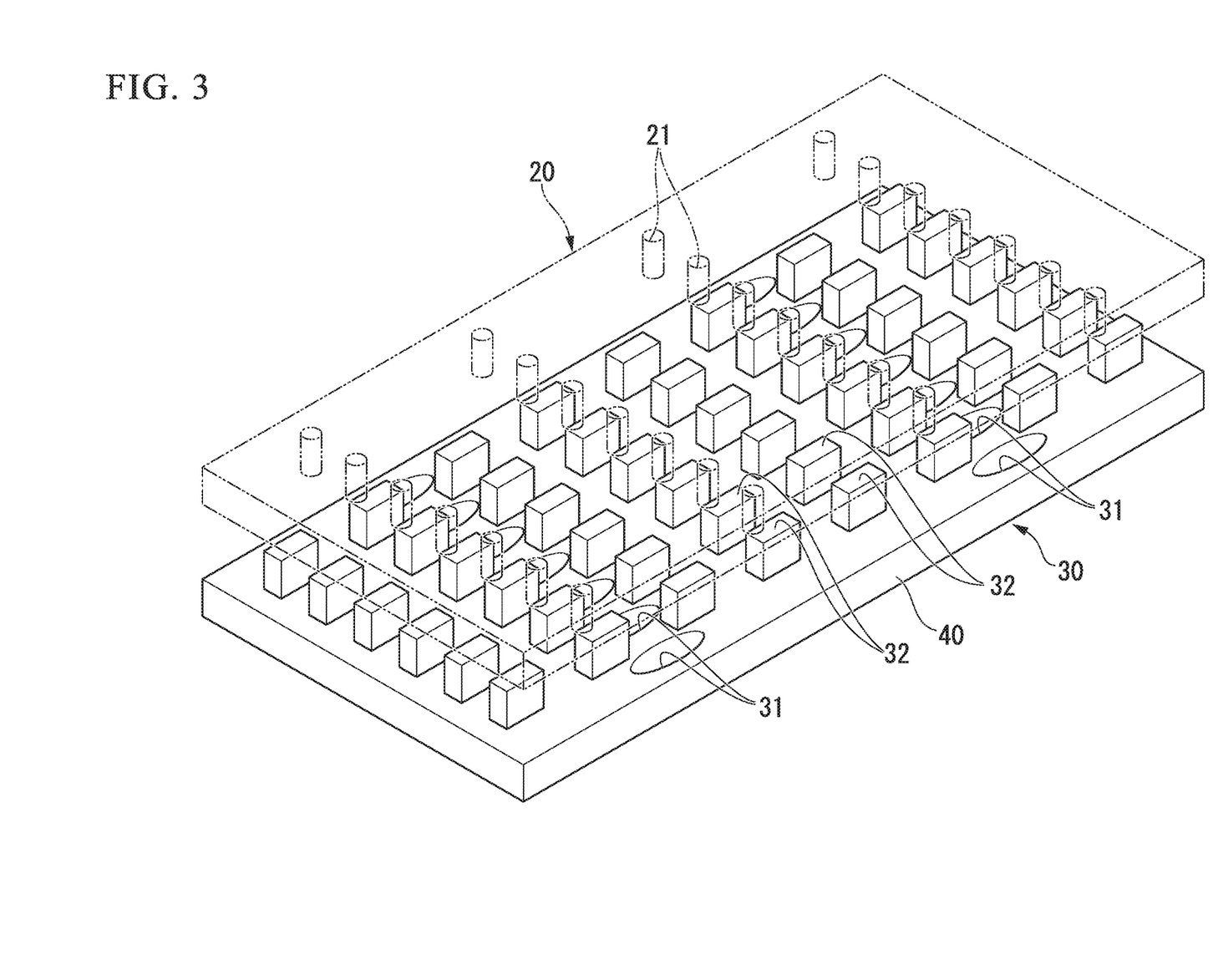
FIG. 3 is a perspective view of a plate-shaped member that forms an inner wall section according to the first embodiment of the present invention.

FIG. 3 is a perspective view of a plate-shaped member 40 forming the inner wall section 30 according to the first embodiment of the present invention.

The inner wall section 30 is constituted by a plurality of plate-shaped members 40. That is, in the embodiment, the plurality of plate-shaped members 40 are gathered, and one inner wall section 30 is formed. The plate-shaped member 40 has a substantially rectangular shape when seen from a plan view. A plurality of effusion cooling holes 31 and a plurality of pins (heat radiation pins) 32 are formed at the plate-shaped member 40.

The effusion cooling hole 31 is formed to be inclined with respect to a surface of the plate-shaped member 40 parallel to the outer wall section 20, and, as shown in FIG. 2, brings the gap S in communication with the combustion region 13. The compressed air introduced into the gap S from the impingement cooling hole 21 flows through the effusion cooling hole 31 by a pressure difference between the gap S and the combustion region 13, takes heat from the inner wall section 30, and is discharged to the combustion region 13. Then, the compressed air discharged to the combustion region 13 flows along an inner surface (a surface opposite to an opposite surface of the outer wall section 20) 30a of the inner wall section 30 to form an air film, and reduces heat input transmitted from the combustion region 13 to the inner wall section 30.

The pin 32 is formed in the gap S to protrude toward the outer wall section 20. The pin 32 is integrally formed with the plate-shaped member 40, or formed as a separate part to be welded or fitted to the plate-shaped member 40. The pin 32 guides the heat introduced from the inner surface 30a exposed to a high temperature into the gap S through heat transfer. In addition, the pin 32 increases a heat-releasing area of the plate-shaped member 40 in the gap S, and increases cooling efficiency by the compressed air flowing through the gap S.

Figure 4:
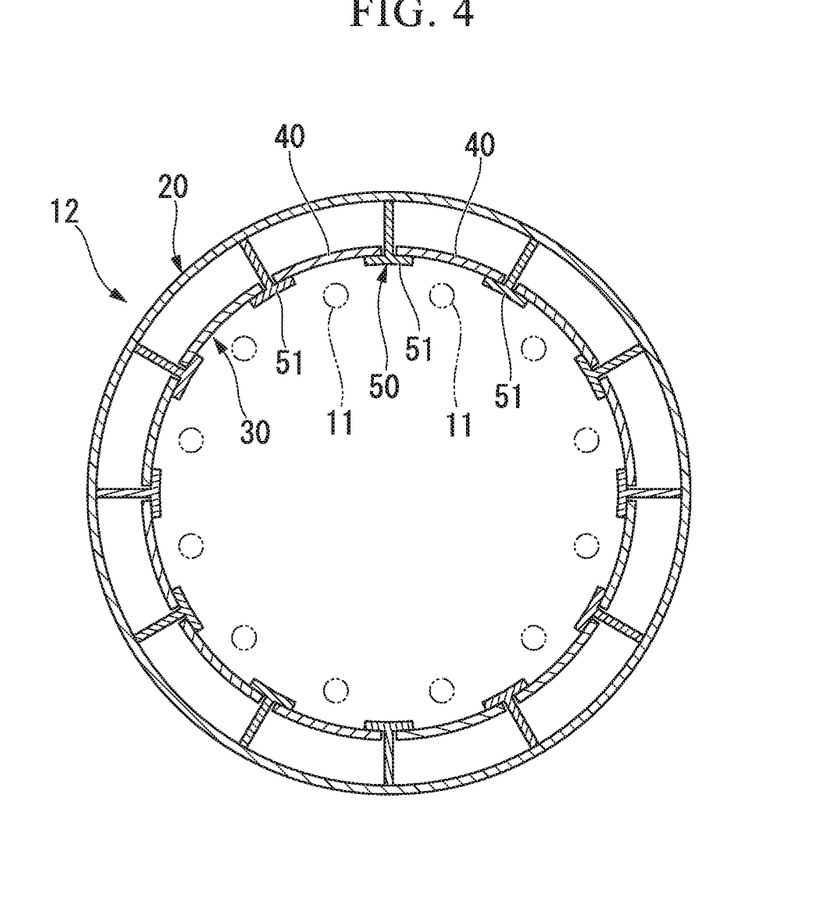
FIG. 4 is a cross-sectional configuration view of the liner taken along line A-A of FIG. 1.
Figure 5:
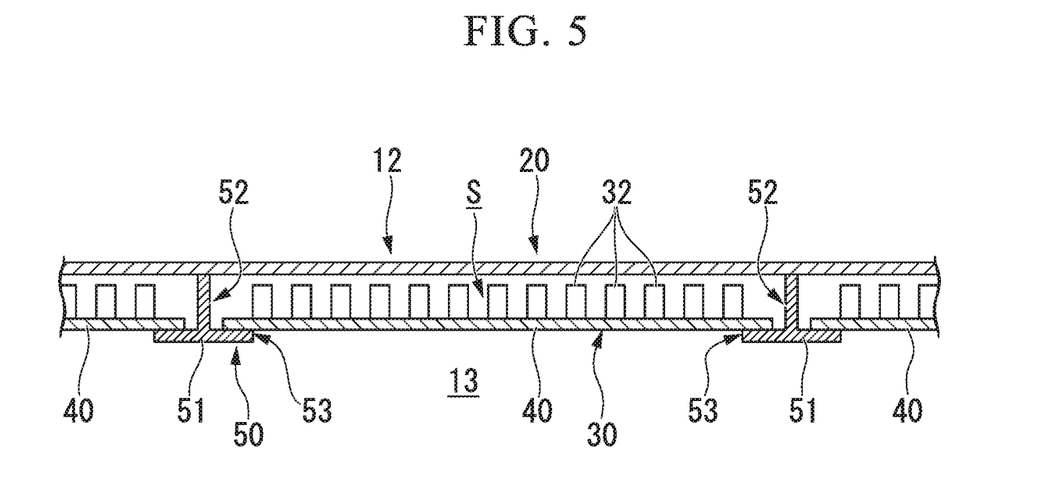
FIG. 5 is an enlarged view of a major portion of a support guide means according to the first embodiment of the present invention.

FIG. 4 is a cross-sectional configuration view of the liner 12 taken along line A-A shown in FIG. 1. FIG. 5 is an enlarged view of a major portion of a support guide means 50 according to the first embodiment of the present invention. Further, in FIG. 4, an inner shell of the liner 12 is not shown, and only an outer shell of the liner 12 is shown as a cross-sectional configuration view. In FIGS. 4 and 5, in order to improve visibility, the effusion cooling hole 31, the pin 32 and the like are not shown.

As shown in FIGS. 4 and 5, the support guide member 50 configured to support and guide the plate-shaped member 40 having the above-mentioned configuration are installed at the outer wall section 20. The support guide member 50 guide the plurality of plate-shaped members 40 to enable insertion and extraction thereof, and support the plurality of plate-shaped members 40 at intervals that can absorb deformation thereof due to thermal expansion.

The support guide member 50 has a rail member 51 configured to guide both end sections of the plate-shaped member 40 in the circumferential direction of the liner 12. The rail member 51 of the embodiment extends in a lengthwise direction of the liner 12 (in FIGS. 4 and 5, a vertical direction with respect to the drawings). The plurality of rail members 51 of the embodiment are installed in the circumferential direction of the liner 12 at intervals. The support guide member 50 includes a plurality of slots configured to accommodate the plate-shaped members 40 formed by the plurality of rail members 51 in the circumferential direction of the liner 12. The plate-shaped member 40 has both end sections guided by the rail member 51 in the circumferential direction of the liner 12, and is able to be freely inserted and extracted in the lengthwise direction of the liner 12 in which the rail member 51 extends.

As shown in FIG. 5, the rail member 51 has a guide section 52 configured to guide a side surface of the plate-shaped member 40, and a support section 53 configured to support a bottom surface of the plate-shaped member 40. The guide section 52 is joined with the outer wall section 20 through welding or the like, and stood up inward in the radial direction from the outer wall section 20. The support section 53 is integrally formed with the guide section 52, and has a hook shape protruding from the guide section 52 in a direction perpendicular to a standing direction of the guide section 52.

A distance between the support sections 53 opposite to the neighboring rail members 51 is smaller than a width of the plate-shaped member 40. The plate-shaped member 40 and the support section 53 come in contact with each other by a pressure difference between the region (the gap) S between the inner wall section 30 and the outer wall section 20, and the combustion region 13. The pressure difference is generated by the pressure of the compressed air supplied to the compressed air chamber 10 from the compressor 2. As the plate-shaped member 40 is pushed to the support section 53 by the pressure difference between the gap S and the combustion region 13, airtightness between the plate-shaped member 40 and the support section 53 is secured.

Meanwhile, a distance between the opposite guide sections 52 of the neighboring rail members 51 is larger than the width of the plate-shaped member 40. Specifically, a distance between the opposite guide sections 52 of the neighboring rail members 51 is set to a distance assumed as the width of the plate-shaped member 40 that thermally expands upon an operation of the combustor 3. The distance is derived based on a temperature to which the plate-shaped member 40 is exposed upon the operation of the combustor 3, a coefficient of line expansion of a material of the plate-shaped member 40, a shape of the plate-shaped member 40, and so on. Further, the plate-shaped member 40 is formed of a heat resistant metal material, and specifically, formed of a nickel-based or cobalt-based metal material.

As shown in FIG. 4, the plurality of plate-shaped members 40 supported by the support guide member 50 are disposed at positions corresponding to the plurality of fuel supply nozzles 11 disposed in the circumferential direction of the liner 12. The plurality of (in the embodiment, 12) fuel supply nozzles 11 are disposed in the circumferential direction of the liner 12 at predetermined intervals. The inner wall section 30 is constituted by the plate-shaped members 40 having the same number (in the embodiment, 12) as the fuel supply nozzles 11. That is, the fuel supply nozzles 11 and the plate-shaped members 40 of the embodiment are disposed to correspond to each other one on one.

Next, working effects of the liner 12 of the combustor 3 having the above-mentioned configuration will be described.

As shown in FIG. 2, the compressed air flowing outside the outer wall section 20 is introduced into the impingement cooling hole 21 by the differential pressure between the inside and the outside of the combustor 3. The compressed air introduced into the impingement cooling hole 21 collides with the inner wall section 30 and cools the inner wall section 30 disposed at the combustion region 13.

The compressed air that collides with the inner wall section 30 flows between the standing pins 32. The pins 32 guide the heat input from the inner surface 30a exposed to the high temperature into the gap S through heat transfer. In addition, the pins 32 increase the heat-releasing area of the inner wall section 30 in the gap S and increase the cooling efficiency by the compressed air flowing through the gap S.

Some of the compressed air flowing between the pins 32 is introduced into the effusion cooling hole 31 by the pressure difference between the gap S and the combustion region 13. The compressed air introduced into the effusion cooling hole 31 takes the heat of the inner wall section 30 to be discharged to the combustion region 13 in a process of passing a long path inclined with respect to the lengthwise direction of the liner 12. Then, the compressed air discharged to the combustion region 13 flows along the inner surface 30a of the inner wall section 30 to form an inflated structure, and reduces heat input transferred to the inner wall section 30 from the combustion region 13.

In this way, according to the dual wall cooling structure of the embodiment, since three cooling functions of the impingement cooling, the heat transfer acceleration by the pins 32, and the effusion cooling by the inclined effusion cooling hole 31 are combined, high cooling performance can be obtained.

The inner wall section 30 of the embodiment has a split structure, and thus maintainability is superior. As shown in FIGS. 4 and 5, each of the plurality of plate-shaped members 40 that form the inner wall section 30 is supported by the support guide member 50 installed at the outer wall section 20. The support guide member 50 has the rail member 51 configured to guide both end sections of the plate-shaped member 40 in the circumferential direction of the liner 12, and the plate-shaped member 40 can be inserted or extracted in a direction in which the rail member 51 extends. As shown in FIG. 2, the rail member 51 of the embodiment can easily extract the plate-shaped member 40 in the lengthwise direction of the liner 12, except for a retainer 19 extending in the lengthwise direction of the liner 12 and serving as a holder. Accordingly, when the specific plate-shaped member 40 is damaged due to generation of cracks or the like, only the damaged plate-shaped member 40 can be selectively extracted to perform exchange, maintenance or the like.

In addition, as shown in FIG. 5, the support guide member 50 supports the plurality of plate-shaped members 40 at intervals such that deformation of the plate-shaped members 40 by the thermal expansion can be absorbed. The plate-shaped member 40 is not joined with the rail member 51, and the guide sections 52 are disposed at intervals in consideration of the width of the plate-shaped member 40 that thermally expands upon the operation of the combustor 3. For this reason, deformation of the plate-shaped member 40 caused along with the thermal expansion is not physically inhibited, and excessive thermal stress is not generated. Further, upon the operation of the combustor 3, since the plate-shaped member 40 is pushed to the support section 53 by the pressure difference between the gap S and the combustion region 13, airtightness between the plate-shaped member 40 and the support section 53 is secured. Accordingly, clearance between the plate-shaped member 40 and the support section 53 does not decrease efficiency of the above-mentioned cooling function. That is, the inner wall section 30 of the embodiment has superior thermal durability.

In addition, in the embodiment, as shown in FIG. 4, the plurality of fuel supply nozzles 11 configured to supply the fuel to the combustion region 13 are disposed in the circumferential direction of the liner 12 at intervals, and the plurality of plate-shaped members 40 supported by the support guide member 50 are disposed at positions corresponding to the plurality of fuel supply nozzles 11 disposed in the circumferential direction of the liner 12. In the annular type liner 12, combustion occurs according to the position at which the fuel supply nozzle 11 is disposed, and thus temperature distribution is achieved in the circumferential direction of the liner 12. For this reason, as the plate-shaped members 40 are disposed at positions corresponding to disposition of the fuel supply nozzles 11, thermal expansion of the plate-shaped members 40 can be substantially uniformized without a bias. Accordingly, it becomes easy to perform adjustment or the like of the distance between the opposite guide sections 52 of the neighboring rail members 51 so that each of the plate-shaped members 40 can freely thermally expands. As a result, thermal durability of the inner wall section 30 of the embodiment is improved.

Accordingly, according to the above-mentioned embodiment, in the liner 12 of the combustor 3 of the dual wall cooling structure including the inner wall section 30 configured to surround the combustion region 13 and in which the plurality of effusion cooling holes 31 are formed, and the outer wall section 20 formed to be spaced apart from the inner wall section 30 and in which the plurality of impingement cooling holes 21 are formed, the inner wall section 30 is constituted by the plurality of plate-shaped members 40, and has the support guide member 50 configured to guide each of the plurality of plate-shaped members 40 to enable free insertion and extraction and configured to support the plurality of plate-shaped members 40 at intervals such that deformation by the thermal expansion can be absorbed.

Accordingly, since the plurality of plate-shaped members 40 are guided by the support guide member 50 to enable free insertion and extraction, the plate-shaped member 40 to be repaired can be selectively removed. In addition, the support guide member 50 supports the plurality of plate-shaped members 40 at intervals such that deformation of the plate-shaped members 40 by the thermal expansion can be absorbed. Accordingly, each of the plate-shaped members 40 can easily thermally expand, and generation of excessive thermal stress can be suppressed.

Accordingly, in the embodiment, the liner 12 of the combustor 3 having high maintainability and thermal durability can be obtained.

(Second Embodiment)

Figure 6:
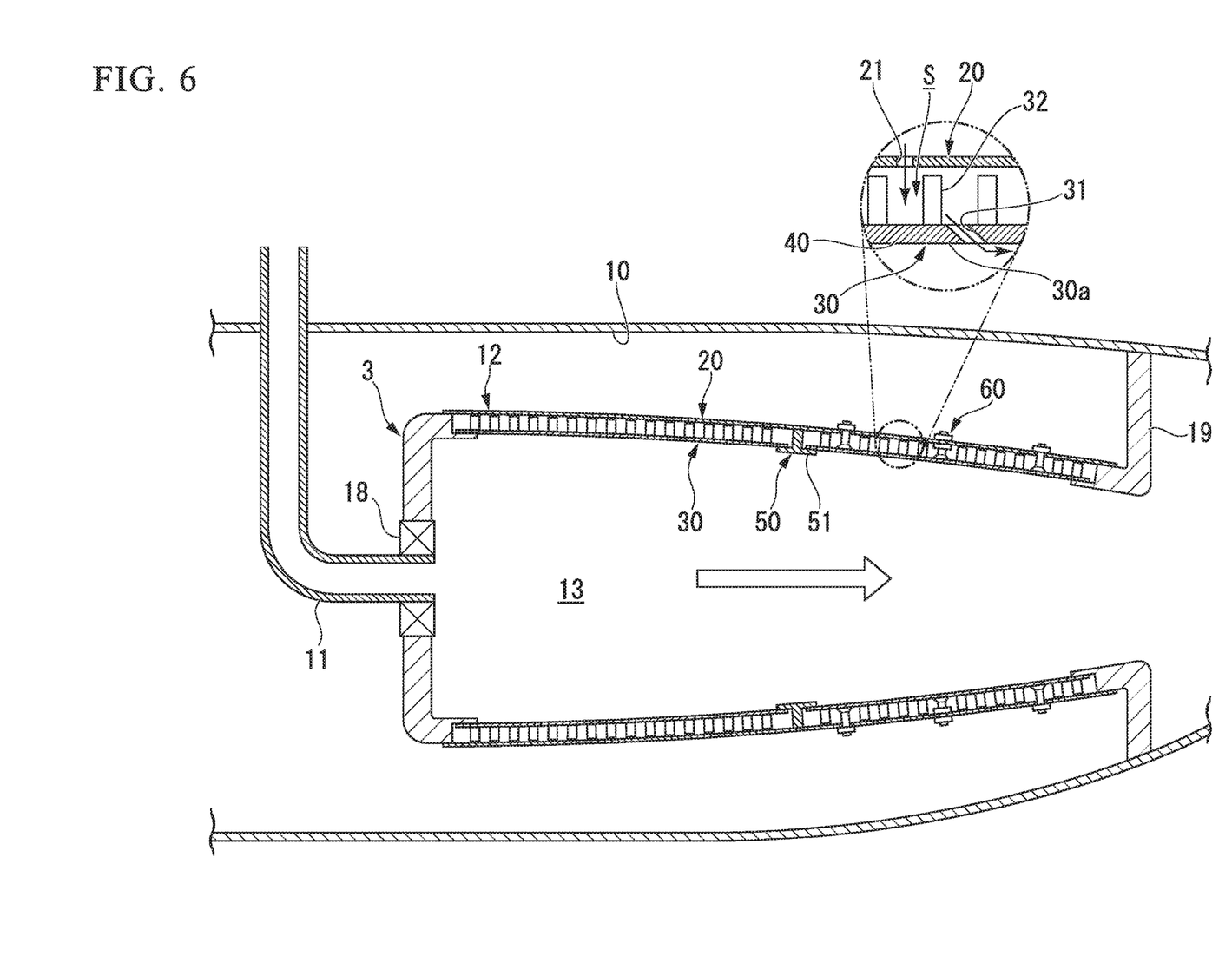
FIG. 6 is a configuration view of a combustor according to a second embodiment of the present invention.

Next, a second embodiment of the present invention will be described. In the following description, the same or similar components as the above-mentioned embodiment are designated by the same reference numerals, and description thereof will be simplified or omitted. FIG. 6 is a configuration of a combustor 3 according to the second embodiment of the present invention.

As shown in FIG. 6, the second embodiment is distinguished from the above-mentioned first embodiment in that the rail member 51 of the support guide member 50 extends in the circumferential direction of the liner 12. That is, in the second embodiment, the plate-shaped member 40 is guided in the circumferential direction of the liner 12 to enable free insertion and extraction.

In addition, the configuration of the liner 12 is distinguished in that the base end side of the liner 12 to which the fuel supply nozzle 11 is connected and the distal end side of the liner 12 opposite thereto. A positioning member 60 is installed at the distal end side of the liner 12.

Figure 7:
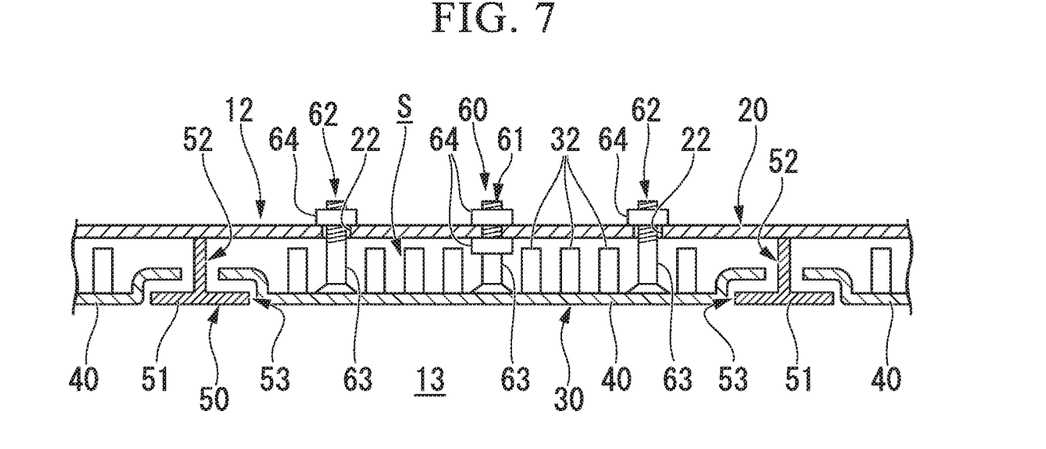
FIG. 7 is a configuration view of a positioning member according to the second embodiment of the present invention.

FIG. 7 is a configuration view of the positioning member 60 according to the second embodiment of the present invention.

The positioning member 60 positions the plate-shaped member 40 supported by the support guide member 50 with respect to the outer wall section 20. In the above-mentioned first embodiment, the plate-shaped member 40 is pushed to the support section 53 by the pressure difference between the gap S and the combustion region 13, and the clearance between the two walls of the inner wall section 30 and the outer wall section 20 is maintained. However, in order to obtain predetermined cooling efficiency based on the above-mentioned configuration, under the assumption that the clearance of the dual wall cannot be maintained, a size, a shape, or the like, of the plate-shaped member 40 should be designed to prevent the above-mentioned situation.

Here, in the second embodiment, the plate-shaped member 40 is positioned with respect to the outer wall section 20 by the positioning member 60 and the clearance of the dual wall is constantly defined. Accordingly, as the clearance of the dual wall is easily managed, and design of a shape or the like of the plate-shaped member 40 in consideration of the cooling efficiency also becomes easy.

The positioning member 60 has a fixing member 61 configured to hold a distance between the plate-shaped member 40 and the outer wall section 20 and fixed with respect to the outer wall section 20, and a movable member 62 configured to hold a distance between the plate-shaped member 40 and the outer wall section 20 and movable with respect to the outer wall section 20 in thermal expansion of the plate-shaped member 40.

Each of the fixing member 61 and the movable member 62 has a screw 63 installed at the plate-shaped member 40 and a nut 64 threadedly engaged with the screw 63. The screw 63 is formed at the plate-shaped member 40 by cutting from the plate-shaped member 40, or by welding or fitting to the plate-shaped member 40 as a separate article. The screw 63 of the fixing member 61 is fastened and fixed to the outer wall section 20 by the nuts 64 disposed at the inside and the outside of the outer wall section 20. That is, the screw 63 of the fixing member 61 cannot be moved relative to the outer wall section 20 in any direction. Meanwhile, the screw 63 of the movable member 62 is inserted through the hole section 22 of the outer wall section 20 having a larger diameter than that of the screw 63 and threadedly engaged with the nut 64 disposed at the outside of the outer wall section 20. That is, the screw 63 of the movable member 62 can be moved relative to the outer wall section 20 at least in a surface direction parallel to the plate-shaped member 40.

Figure 8:
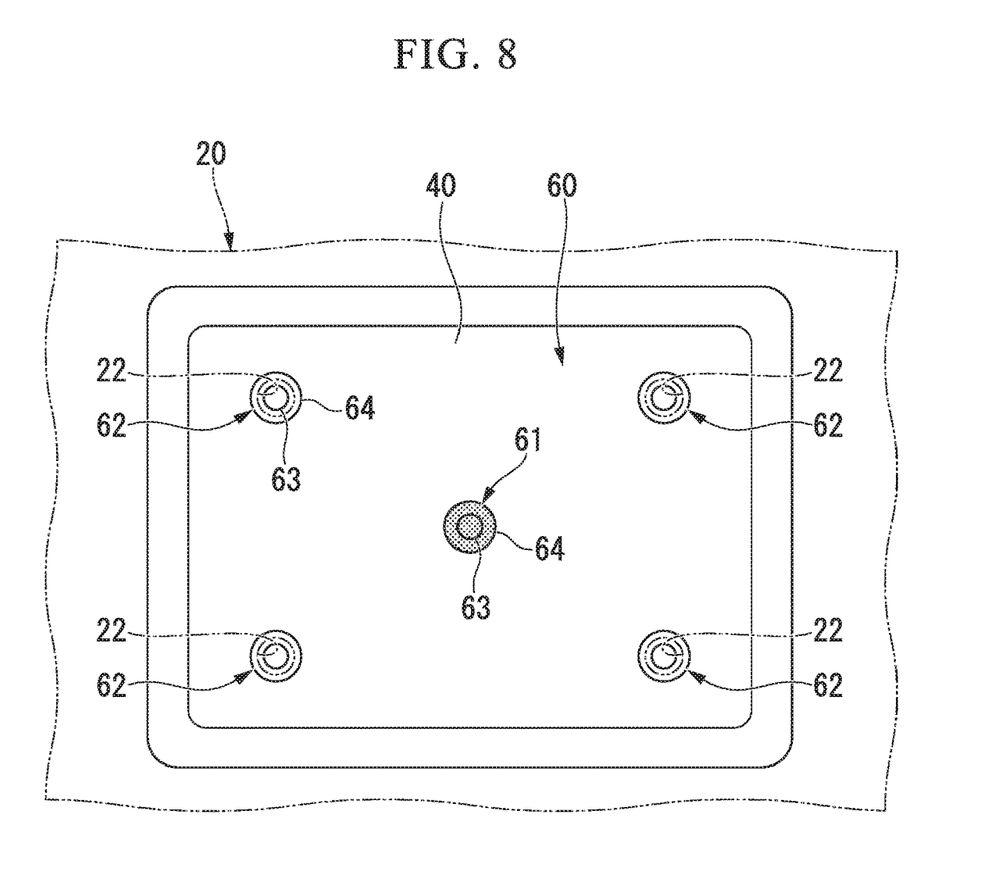
FIG. 8 is a plan view showing disposition of a fixing member and a movable member according to the second embodiment of the present invention.

FIG. 8 is a plan view showing disposition of the fixing member 61 and the movable member 62 according to the second embodiment of the present invention. As shown in FIG. 8, one fixing member 61 is disposed at a central position of the plate-shaped member 40, and four movable members 62 are disposed around the central position of the plate-shaped member 40 at substantially equal intervals. As the fixing member 61 is disposed at the central position of the plate-shaped member 40, thermal expansion of the plate-shaped member 40 is generated about the fixing member 61.

According to the above-mentioned configuration, the distance between the outer wall section 20 and the plate-shaped member 40 can be held by the fixing member 61 and the movable member 62. Even when the plate-shaped member 40 thermally expands about the fixing member 61, since the movable member 62 is movable relative to the outer wall section 20 at least in a surface direction parallel to the plate-shaped member 40 according to the thermal expansion, thermal expansion of the plate-shaped member 40 is not inhibited by the positioning.

In addition, when the fixing member 61 is disposed at the central position of the plate-shaped member 40, thermal expansion is generated at the central position as a fixed point. For this reason, since a displacement amount of an edge section of the plate-shaped member 40 caused along with the thermal expansion is substantially uniformized, design of a shape or a size of the plate-shaped member 40 or the hole section 22, clearance between the two walls of the inner wall section 30 and the outer wall section 20, and so on, becomes easy.

Further, when the positioning means 60 having the above-mentioned configuration is formed, management of the clearance between the two walls of the inner wall section 30 and the outer wall section 20 becomes easy and the fixed point is generated. For this reason, the configuration of the above-mentioned first embodiment is relatively advantageous in thermal durability. Here, as shown in FIG. 6, in the second embodiment, in the base end side of the liner 12 exposed to a high temperature atmosphere (for example, 2000° C.) by the combusted gas, the same configuration as in the first embodiment is employed, and in the distal end side of the liner 12 having a lower temperature than that of the base end side of the liner 12, the positioning member 60 is employed. Accordingly, the liner 12 having an effective structure corresponding to the temperature distribution can be provided.

Hereinabove, while the exemplary embodiments of the present invention have been described with reference to the accompanying drawings, the present invention is not limited to the embodiments. All shapes or combinations of components shown in the above-mentioned embodiment are merely exemplary, and may be variously modified based on design requirements without departing from the gist of the present invention.

For example, in the embodiment, while the positioning member 60 is constituted by the fixing member 61 and the movable member 62, the present invention is not limited to this configuration. For example, the positioning member 60 may be constituted by only the movable member 62. In addition, the number or disposition of the movable member 62 of the embodiment is also exemplary, and the present invention is not limited to the number or disposition. For example, the number of movable members 62 may be one or five or more. The movable members 62 may not be disposed at equal intervals.

In addition, for example, in the embodiment, while each of the fixing member 61 and the movable member 62 is configured by assembling the screw 63, the nut 64, and so on, the present invention is not limited to this configuration. For example, a configuration in which the pin and the flange are assembled may be provided.

In addition, for example, in the embodiment, while the present invention is applied to the combustor of the gas turbine, the present invention can also be applied to another combustor, for example, an afterburner of a jet engine or the like.

INDUSTRIAL APPLICABILITY

According to the present invention, it is possible to obtain a combustor liner having high maintainability and thermal durability.

REFERENCE SIGNS LIST

12: liner (combustor liner), 11: fuel supply nozzle, 13: combustion region,
20: outer wall section, 21: impingement cooling hole, 30: inner wall section,
31: effusion cooling hole, 32: pin (heat radiation pin), 40: plate-shaped member,
50: support guide member, 51: rail member, 60: positioning member,
61: fixing member, 62: movable member

What is claimed is:

1. A combustor liner with a dual wall cooling structure comprising:
   an inner wall section configured to surround a combustion region and in which a plurality of effusion cooling holes are formed; and
   an outer wall section formed to be spaced apart from the inner wall section and in which a plurality of impingement cooling holes are formed,
   wherein the inner wall section is constituted by first and second plate-shaped members, the first plate-shaped member disposed close to an upstream end of the combustor liner and extending in circumferential and lengthwise directions of the combustor liner, and the second plate-shaped member disposed close to a downstream end of the combustor liner and extending in the circumferential and lengthwise directions,
   the outer wall section is provided with a rail member extending in the circumferential direction and standing from the outer wall section toward the combustion region,
   the rail member includes:
      a guide section standing from the outer wall section toward the combustion region, disposed between a first side surface of a first end portion of the first plate-shaped member and a second side surface of a second end portion of the second plate-shaped member, and capable of guiding the first side surface of the first end portion of the first plate-shaped member and the second side surface of the second end portion of the second plate-shaped member, the first end portion which is one of end portions of the first plate-shaped member in the lengthwise direction and close to the downstream end of the combustor liner, the first side surface facing toward the downstream end of the combustor liner, the second end portion which is one of end portions of the second plate-shaped member in the lengthwise direction and close to the upstream end of the combustor liner, the second side surface facing toward the upstream end of the combustor liner, and
      a support section protruding from an end portion of the guide section close to the combustion region toward the upstream and downstream ends of the combustor liner and capable of supporting a first bottom surface of the first end portion of the first plate-shaped member and a second bottom surface of the second end portion of the second plate-shaped member, the first and second bottom surfaces facing toward the combustion region,
   the first side surface of the first plate-shaped member and the second side surface of the second plate-shaped member are separated from the guide section by an interval capable of absorbing deformation of the first and second plate-shaped members due to thermal expansion,
   the rail member is capable of guiding and supporting the first and second plate-shaped members to enable free insertion and extraction of the first and second plate-shaped members in the circumferential direction,
   the second plate-shaped member is provided with a screw standing thereon and capable of being inserted through a hole section penetrating through the outer wall section, and
   the second plate-shaped member is capable of being inserted and extracted when the screw is not inserted into the hole section.

2. The combustor liner according to claim 1, further comprising:
   a positioning member including:
   the screw; and
   a nut threadedly engaged with the screw,
   wherein the positioning member positions the second plate-shaped member to disable insertion and extraction of the second plate-shaped member with respect to the outer wall section.

3. The combustor liner according to claim 2, wherein the positioning member includes:
   a movable member configured to be movable with respect to the outer wall section in a direction in which the second plate-shaped member thermally expands, and
   the movable member includes:
   a first screw inserted through a first hole section and having a smaller diameter than that of the first hole section, the first screw serving as the screw, and the first hole section serving as the hole section,
   a first nut threadedly engaging with a portion of the first screw on an outer side than the outer wall portion, the first nut serving as the nut, and
   the movable member positions the second plate-shaped member to enable the second plate-shaped member to relatively move with respect to the outer wall section due to thermal expansion within the first hole section.

4. The combustor liner according to claim 3, wherein the positioning member includes:
the movable member; and
a single fixing member configured to hold a distance between the second plate-shaped member and the outer wall section and fixed with respect to the outer wall section,
the fixing member includes:
a single second screw inserted through a single second hole section, the second screw serving as the screw, and the second hole section serving as the hole section,
a second nut threadedly engaging with a portion of the second screw on an outer side than the outer wall portion, the second nut serving as the nut,
a third nut threadedly engaging with a portion of the second screw on an inner side than the outer wall portion, the third nut serving as the nut, and
the fixing member positions the second plate-shaped member to disable the second plate-shaped member from relatively moving with respect to the outer wall section.

5. The combustor liner according to claim 4, wherein the single fixing member is disposed at a central position of the second plate-shaped member, and
the movable member is disposed around the central position of the second plate-shaped member.

6. The combustor liner according to claim 1, wherein a plurality of heat radiation pins protruding toward the outer wall section are formed at each one of the first and second plate-shaped members.

* * * * *